United States Patent [19]

Cohen et al.

[11] Patent Number: 4,873,291
[45] Date of Patent: Oct. 10, 1989

[54] RUBBER VULCANIZATION SYSTEM WITH TRIAZINE COMPOUNDS

[75] Inventors: Martin P. Cohen, Akron; Richard M. D'Sidocky, Ravenna, both of Ohio

[73] Assignee: The Goodyear Tire & Rubber Company, Akron, Ohio

[21] Appl. No.: 129,798

[22] Filed: Dec. 7, 1987

Related U.S. Application Data

[62] Division of Ser. No. 23,328, Mar. 9, 1987, Pat. No. 4,755,320.

[51] Int. Cl.$^4$ .......................... C08F 8/34; C08C 19/20
[52] U.S. Cl. ...................................... 525/348; 525/232
[58] Field of Search ................................ 525/348, 349

[56] References Cited

U.S. PATENT DOCUMENTS 3,366,598  1/1968  Westlinning ........................ 525/348

Primary Examiner—Christopher Henderson
Attorney, Agent, or Firm—Bruce J. Hendricks

[57] ABSTRACT

This invention relates to the discovery that a morpholine polysulfide, such as morpholine tetrasulfide, in combination with a substituted triazine having at least one dialkyl dithiocarbamyl radical provides for excellent vulcanization of rubbers and results in an improved final rubber vulcanizate possessing superior physical properties and reversion resistance.

4 Claims, No Drawings

RUBBER VULCANIZATION SYSTEM WITH TRIAZINE COMPOUNDS

This is a division of application Ser. No. 023,328 filed on Mar. 9, 1987, how U.S. Pat. No. 4,755,320.

TECHNICAL FIELD

This invention relates to the vulcanization of diene elastomers. More particularly, the invention relates to an improved accelerator composition for the vulcanization of diene elastomers as well as to a method of vulcanization therewith.

BACKGROUND ART

In the manufacture of rubber articles, crude or raw rubber is compounded with various ingredients among which are sulfur and accelerators of vulcanization. The primary function of an accelerator or accelerator system is to increase the rate of the vulcanization process while allowing sufficient time to mix the accelerators into the rubber at an elevated temperature before vulcanization commences. This delay before the initiation of vulcanization is commonly referred to as scorch time.

The properties of a final rubber vulcanizate that are of importance include tensile strength, set, hysteresis, aging properties, reversion resistance and others. Other factors relating to the vulcanization which are of importance are the rate of cure, the cure time, the scorch behavior, the extent of cure and tear resistance. These physical properties can be altered either beneficially or detrimentally through the inclusion of chemicals or components that impact upon the rate and state of vulcanization.

Over the last 20 years, three broad classes of sulfur vulcanization system have been differentiated by the relative levels of sulfur and organic accelerator (Table I).

TABLE I

| Sulfur Vulcanization Systems | | |
|---|---|---|
| | Sulfur | Accelerator |
| | parts phr | |
| Conventional | 2–3.5 | 0.3–1 |
| Semi-EV[a] | 1–2 | 1–2.5 |
| EV[a] | 0.25–0.7 | 2.5–5 |

[a]Efficient vulcanization.

At optimum cure, conventional systems give vulcanizates with mostly polysulfidic crosslinks and a high level of main-chain modification. Low sulfur and high accelerator levels give mainly monosulfidic crosslinks and much less chain modification; they are known as "efficient" vulcanization (EV) systems. Intermediate semi-EV systems afford a compromise between the high tensile strength, tear and fatigue properties coupled with susceptibility to reversion and oxidative aging of conventional systems and the high levels of resistance to reversion and aging, but lower fatigue, strength and wear properties of EV systems.

A wide range of accelerator combinations can be used within these systems and attention has focused mainly on sulfur:accelerator ratios to determine the choice for a particular application. However, there is evidence that the nature of the accelerator has an influence on the aging and reversion resistance of natural rubber vulcanizates. It has also been suggested that the use of sulfur donors to reduce the level of elemental sulfur can improve reversion and aging resistance.

An accelerator may provide too slow a cure rate when used alone. It may be speeded up by adding small amounts of another accelerator or a so-called activator. The accelerators which are most commonly activated are the thiazoles including thiazole sulfenamides. The accelerators most commonly used as activators are the thiuram sulfides, dithiocarbamates and the guanidines.

One of the most widely used accelerator systems or combinations for diene rubbers consists of a benzothiazole sulfenamide and a thiuram sulfide or dithiocarbamate. These are safe, non-scorchy and provide adequate rates of cure in a reasonable length of time and result in vulcanizates with good physical properties. Nevertheless, in commercial operations, for example, in the manufacture of automobile tires, it is always desirable to improve productivity and cost. One means for increasing productivity is to reduce vulcanization time without sacrificing quality or operating safety. In the past, numerous cure systems have been evaluated, some of which significantly increase the rate of cure, but at a cost of reduced processing safety, scorch or reversion resistance and these limitations have restricted their use.

U.S. Pat. No. 2,061,520 is concerned with cyanuryl derivatives of dithiocarbamic acids. This patent discusses the use of these derivatives as accelerators for the vulcanization of natural rubber or artificial rubber-like masses. Specifically, this patent is concerned with a process which comprises heating a cyanuryl halogenide with a sodium salt of a dialkyl dithiocarbamic acid at a temperature between about 30° and 60° C. in the presence of a solvent. This patent does not suggest or disclose the use of cyanuryl derivatives of dithiocarbamic acids in combination with morpholine polysulfides nor the beneficial properties that can be obtained therewith in the vulcanization of natural or synthetic elastomers.

U.S. Pat. No. 3,366,598 is concerned with a process for the vulcanization of rubbers containing fillers. Specifically, this patent discloses a process for vulcanizing a vulcanizable material selected from the group consisting of rubber and rubber-like elastomers through the use of a vulcanization system consisting of (1) an effective amount of sulfur and (2) an effective amount of a mercaptotriazine compound such as 2-dimethylamino-4,6-dimercapto-s-triazine. This patent does not suggest or disclose the use of dialkyl dithiocarbamyl substituted triazines in combination with a morpholine polysulfide, such as morpholine tetrasulfide, to achieve unexpected benefits in the vulcanization reaction nor the highly desirable physical properties of the final vulcanizate.

U.S. Pat. No. 3,844,970 relates to a vulcanization accelerator combination and its use in the vulcanization of natural or synthetic rubbers made from halogen-free dienes. This patent discloses vulcanization accelerators such as triazine substituted in the 2, 4 and 6 positions in combination with at least one thiazole accelerator and optionally at least one thiuram accelerator. This invention specifically relates to a mixture of special accelerators, such as 2-ethylamino-4,6-bis-(N-cyclohexyl-sulphenamido)-s-triazine and dibenzothiazyl disulfide and a thiuramic accelerator if desired such as tetraethyl thiuram disulfide. This patent does not suggest the use of specific dialkyl dithiocarbamic substituted triazines in combination with morpholine polysulfides.

U.S. Pat. No. 4,012,332 relates to the discovery of an accelerator composition for the vulcanization of diene elastomers comprising a benzylthiazole sulfenamide, a thiuram sulfide and copper 2-mercaptobenzothiazole.

U.S. Pat. No. 4,116,855 relates to stabilized accelerator compositions for rubber. More particularly, the invention relates to an accelerator composition comprising N,N'-{(thiocarbonyl)thio}dimorpholine and an effective stabilizing amount of an acrylic amide or ester.

U.S. Pat. No. 4,339,577 relates to vulcanizable rubber compositions inhibited from premature vulcanization through the use of a compound such as 2-(thioamino)-4,6-diamino-1,3,5-triazines. This patent relates to the discovery that (thioamino)-triazines are premature vulcanization inhibitors. Surprisingly, reversal of the respective positions of the sulfur and nitrogen atoms with respect to the triazine ring has a significant effect upon the vulcanization activity of the compounds. Triazines having aminothio substitutents are accelerators whereas triazines having thioamino substitutents are premature vulcanization inhibitors. Compounds such as 2-(methylthioamino)-4,6-di(t-butylamino)-1,3,5-triazine are illustrative of the inhibitors of the '577 invention.

One skilled in this art is aware that conventional cure systems (normally comprised of a high percent of polysulfidic crosslinks) will afford high tensile, tear and fatigue properties while EV systems (comprised of a high percent of mono and disulfidic crosslinks) afford high resistance to reversion and aging but at the expense of lower fatigue and strength (tensile and tear).

The novel and unobvious use of morpholine sulfides in combination with triazines have resulted in cures which not only give the crosslink types and physical properties of a conventional cure but also the retention properties of an EV vulcanization system.

None of the prior art alone or in combination suggests the use of a morpholine polysulfide in combination with a dithiocarbamyl triazine for the vulcanization of rubbers. In addition, the prior art fails to appreciate or disclose the beneficial curing characteristics and final vulcanizate properties that can be obtained through the use of materials such as morpholine tetrasulfide and 2,4-bis(dimethyldithiocarbamyl)-6-chloro-1,3,5-triazine.

DISCLOSURE OF THE INVENTION

There is disclosed a rubber vulcanization composition comprising:

(a) a morpholine polysulfide containing from 2 to 5 sulfur atoms and;

(b) a dithiocarbamyl triazine of the structural formula:

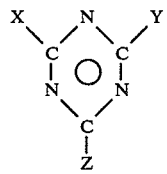

wherein X, Y and Z are the same or different radicals selected from the group consisting of halogen, alkoxy of 1-8 carbon atoms, the radical —S—R wherein R can be from 1-8 carbon atoms, the radical —N—$R^1$—$R^2$ wherein $R^1$ and $R^2$ can be the same or different radicals of 1 to 8 carbon atoms or $R^1$ and $R^2$ taken together complete with the nitrogen atom to which they are attached can form a six membered ring which may contain oxygen as a heteroatom, and a dithiocarbamyl radical of the formula:

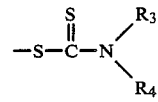

wherein $R^3$ and $R^4$ are the same or different radicals selected from alkyl of 1 to 8 carbon atoms or $R^3$ and $R^4$ taken together with the nitrogen atom to which they are attached form a six membered ring which may contain oxygen as a heteroatom;

with the proviso that at least one of X, Y or Z is always a dithiocarbamyl radical and (c) sulfur;

wherein the weight percent of component (a) can range from 20 to 98%, the weight percent of component (b) can range from 2 to 40% and the weight percent of component (c) can range from 0 to 70% based on the total weight of the composition with the proviso that the weight percent of (a) is always equal to or greater than the weight percent of (b).

There is also disclosed a process for vulcanizing a sulfur vulcanizable material, said process comprising: (1) admixing an effective amount of a vulcanization system with the vulcanizable material; said vulcanization system comprising: (a) a morpholine polysulfide containing from 2 to 5 sulfur atoms and (b) a dithiocarbamyl triazine of the structural formula:

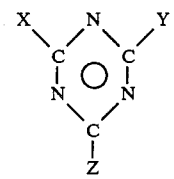

wherein X, Y and Z are the same or different radicals selected from the group consisting of halogen, alkoxy of 1-8 carbon atoms, the radical —S—R wherein R can be from 1-8 carbon atoms, the radical —N—$R^1$—$R^2$ wherein $R^1$ and $R^2$ can be the same or different radicals of 1 to 8 carbon atoms or $R^1$ and $R^2$ taken together complete with the nitrogen atom to which they are attached can form a six membered ring which may contain oxygen as a heteroatom, and a dithiocarbamyl radical of the formula:

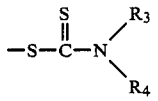

wherein $R^3$ and $R^4$ are the same or different radicals selected from alkyl of 1 to 8 carbon atoms or $R^3$ and $R^4$ taken together with the nitrogen atom to which they are attached form a six membered ring which may contain oxygen as a heteroatom; with the proviso that at least one of X, Y or Z is always a dithiocarbamyl radical and (c) sulfur; wherein the weight percent of component (a) can range from 20 to 98%, the weight percent of component (b) can range from 2 to 40% and the weight percent of component (c) can range from 0 to 70% based on the total weight of the composition with the proviso that the weight percent of (a) is always equal to or greater than the weight percent of (b); (2) heating the admixture to a temperature of from 100°–250° C.

There is further disclosed a composition comprising a sulfur-vulcanizable diene rubber and a vulcanization composition, said vulcanization composition comprising; (a) a morpholine polysulfide containing from 2 to 5 sulfur atoms and (b) a dithiocarbamyl triazine of the structural formula:

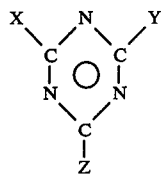

wherein X, Y and Z are the same or different radicals selected from the group consisting of halogen, alkoxy of 1-8 carbon atoms, the radical —S—R wherein R can be from 1-8 carbon atoms, the radical —N—R$^1$—R$^2$ wherein R$^1$ and R$^2$ can be the same or different radicals of 1 to 8 carbon atoms or R$^1$ and R$^2$ taken together complete with the nitrogen atom to which they are attached can form a six membered ring which may contain oxygen as a heteroratom, and a dithiocarbamyl radical of the formula:

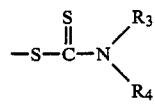

wherein R$^3$ and R$^4$ are the same or different radicals selected from alkyl of 1 to 8 carbon atoms or R$^3$ and R$^4$ taken together with the nitrogen atom to which they are attached form a six membered ring which may contain oxygen as a heteroatom; with the proviso that at least one of X, Y or Z is always a dithiocarbamyl radical and (c) sulfur; wherein the weight percent of component (a) can range from 20 to 98%, the weight percent of component (b) can range from 2 to 40% and the weight percent of component (c) can range from 0 to 70% based on the total weight of the composition with the proviso that the weight percent of (a) is always equal to or greater than the weight percent of (b).

The essential feature of the present invention resides in the discovery that certain dialkyl dithiocarbamate substituents on a triazine ring, in combination with a morpholine polysulfide, will result in vulcanization of elastomers at rapid rates with acceptable scorch delay, and minimal cure reversion, and result in final vulcanizate physical properties that are highly desirable, such as tear, age and fatigue resistance.

Illustrative of the morpholine polysulfides that are useful in the instant invention are compounds of the following structural formula:

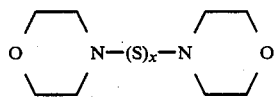

wherein x can be a whole integer from 2 to 5. Representative of the morpholine polysulfides useful in the instant invention are morpholine disulfide and morpholine tetrasulfide (hereinafter MTS) with morpholine tetrasulfide being preferred.

Illustrative examples of the dithiocarbamate substituted triazines useful in the instant invention are compounds such as 2,4-bis(dimethyldithiocarbamyl)-6-chloro-1,3,5-triazine, (hereinafter referred to as DTCT), 2,4,6-tris (dimethyldithiocarbamyl)-1,3,5-triazine, 2-dimethyldithiocarbamyl-4,6-dichloro-1,3,5-triazine, 2,4-bis (dimethyldithiocarbamyl)-6-methoxy-1,3,5-triazine, 2,4-bis(diethyldithiocarbamyl)-6-chloro-1,3,5-triazine, 2,4-bis(diisopropyldithiocarbamyl)-6-chloro-1,3,5-triazine, 2-morpholinodithiocarbamyl-4,6-dichloro-1,3,5-triazine; and 2-morpholinodithiocarbamyl-4-methoxy-6-chloro-1,3,5-triazine.

The diene elastomers which are effectively and efficiently vulcanized with the accelerator system of this invention include the general purpose diene elastomers such as SBR rubber (styrene-butadiene copolymers), natural rubber, cis-1,4-polybutadiene, polyisoprene, and other elastomers such as EPDM, butadiene/isoprene copolymers, butadiene/isoprene/styrene terpolymers, butadiene-acrylonitrile elastomers and blends thereof. In general, any elastomer that is sulfur vulcanizable will benefit through the use of the instant invention.

The invention provides a greatly increased rate of cure or shortened cure time, adequate processing safety, and excellent aged and unaged physical properties of the vulcanizate. This is surprising since it would have been expected that the use of morpholine tetrasulfide and a dithiocarbamate substituted triazine cure would have reduced unaged strength and fatigue properties.

The results are also surprising since in EV systems without sulfur, a morpholine polysulfide alone provides a sluggish and reversion-prone cure, while dithiocarbamyl substituted triazine alone does not cure at all, yet a combination of morpholine polysulfide and dithiocarbamyl substituted triazine provides fast cure, high cure state, and no cure reversion on overcure.

Generally, the accelerator system of the instant invention is used at a concentration of from about 0.1 to 10 parts per 100 parts of elastomer by weight with 1.0 to 5 parts being preferred. The weight of the morpholine polysulfide in the system always equals or exceeds the amount of the triazine. Specifically, a weight ratio of the morpholine polysulfide to substituted triazine of from 1:1 to 10:1 has been found useful. The amount of sulfur in the system is dependent upon the final properties desired; however, morpholine polysulfides are sulfur donors and may alleviate the need for the use of additional sulfur in the compounded elastomer. It should be obvious to those skilled in the art that many factors may operate to determine the concentration of the system in the elastomer, such as the nature of the elastomer (natural rubber and cis-polyisoprene require less accelerator than the synthetic butadiene/styrenes or the butadiene/ acrylonitrile elastomers) and the kind of cure behavior desired. It is well within the skill of those to whom the invention pertains to determine the optimum levels or concentration based upon the desired properties.

The accelerator system of this invention may be used as a premixed blend of the components or added individually to the elastomer.

In addition to the accelerator system of this invention the elastomer to be vulcanized may contain a variety of other conventional rubber compounding ingredients such as pigments, carbon black, clays, silica, titanium dioxide, antioxidants, processing oils, zinc oxide, lubricants such as stearic acid, waxes and the like which are known to those skilled in the art.

The present invention overcomes the disadvantages of hithertoknown conventional accelerator systems without any less of their main advantage, that being unaged high moduli, high strength and fatigue properties. The combination or system according to the invention, therefore, combines the advantages of short cure times with resulting high moduli, high strength and fatigue properties coupled with retention of properties on aging. It could not be foreseen that the high degree of crosslinking of the vulcanizates would be preserved when using the substituted triazine in combination with the morpholine polysulfide which is very effective when used alone but is, however, subject to reversion.

Vulcanization of diene rubbers is generally carried out at temperatures of between about 100° C. and 250° C. preferably 110° to 180° C. Any of the usual vulcanization processes used in the art such as heating in a press, heating with superheated steam or hot air, or in a salt bath may be used.

The properties of the vulcanizates produced with the vulcanization system of the invention are in every respect equal to those obtained with conventional vulcanization systems or surpass them. The new vulcanization system manifests itself in unexpectedly high tearing strengths, moduli or elasticities and fatigue properties of the vulcanizate along with improved retention of properties on aging.

The following examples are provided for illustrative purposes and include particular features of the invention; however, the examples should not be construed as limiting the invention as many variations are possible without departing from the scope thereof.

Best Mode

The MTS used in the following examples was prepared according to the procedure described in U.S. Pat. No. 4,632,988 which is herein incorporated by reference.

In general the DTCT used in the following examples was prepared by combining 1.0 mole of cyanuric chloride in acetone solution with 2.0 moles of sodium dimethyldithiocarbamate in aqueous solution at 5°-10° C. The mixture is stirred for about 1 hour, the product filtered and dried prior to use. Other triazines were made by analogous method. U.S. Pat. No. 2,061,520 describes a process for making other dithiocarbamate substituted triazines and said patent is herein incorporated by reference.

Example 1 and Comparative 1

The formulation set out in Table II was utilized for Example 1 and Comparative 1. The various additives were compounded using conventional rubber compounding techniques and the samples were vulcanized by compression molding methods for 18 minutes at 150° C.

TABLE II

| Formulation for Example 1 & Comparative 1 Amounts Listed are Parts by Weight | | |
|---|---|---|
| Component | Comparative 1 | Example 1 |
| Polyisoprene | 40 | 40 |
| Cis-1,4-polybutadiene | 60 | 60 |
| Carbon black | 50 | 50 |
| Tackifier | 10 | 10 |
| Process Oil | 5 | 5 |
| Amine Antidegradant | 5.25 | 5.25 |
| Stearic Acid | 1.0 | 1.0 |
| ZnO | 3.5 | 3.5 |

TABLE II-continued

| Formulation for Example 1 & Comparative 1 Amounts Listed are Parts by Weight | | |
|---|---|---|
| Component | Comparative 1 | Example 1 |
| Sulfenamide Type Accelerator | 0.50 | — |
| Sulfur | 2.25 | 0.20 |
| MTS | — | 1.50 |
| DTCT | — | 0.25 |

After curing, these samples were evaluated using accepted rubber testing procedures. The data is set forth in Table III.

TABLE III

| Physical Properties of Example 1 and Comparative 1 Monsanto Rheometer, 1° Arc-150° C. | | |
|---|---|---|
| | Comparative 1 | Example 1 |
| $M_{HF}$, Torque Units (dNm) | 29.5 | 30.0 |
| $M_L$, Torque Units (dNm) | 6.8 | 7.5 |
| Cure Time, t'c(90), min. | 21.9 | 9.5 |
| Cure Time, t'c(25), min. | 7.7 | 4.8 |
| Cure Rate, dNm/min. | 1.04 | 3.13 |
| Crosslink Density and Type Analysis* | | |
| Density**, v × 10⁴ | 1.043 | 1.035 |
| % $S_x$, polysulfide | 76.7 | 72.4 |
| % $S_2$, disulfide | 18.7 | 23.0 |
| % $S_1$, monosulfide | 4.6 | 4.6 |
| Stress-Strain Data Unaged | | |
| Modulus at 300% Elongation, MPa | 4.5 | 5.7 |
| Tensile Strength, MPa | 14.1 | 15.7 |
| Elongation at break, % | 675 | 670 |
| Air Aged 14 Days at 70° C. | | |
| Modulus at 300% Elongation, MPa | 9.2 | 7.6 |
| Tensile Strength, MPa | 12.0 | 14.4 |
| Elongation at break, % | 400 | 570 |
| Change in Stress-Stain Properties on Air Oven Aging 14 Days at 70° C. | | |
| | Comparative 1 | Example 1 |
| Modulus at 300% Elongation, % | +104 | +33 |
| Tensile Strength, % | −15 | −8.3 |
| Elongation at break, % | −41 | −15 |
| Tear Strength, Instron | | |
| Room Temperature, N/cm | 1458 ± 80 | 1392 ± 99 |
| Air Aged 14 Days at 70° C., N/cm | 297 ± 40 | 811 ± 157 |
| % Change in Tear on Aging 14 Days at 70° C. | | |
| % Change | −80 | −42 |
| DeMattia Flex Crack Growth as per ASTM D813 | | |
| Test at 93° C. | Crack Growth Rate | |
| Rate Unaged | 0.037 cm/min | 0.022 cm/min |
| Aged 14 Days at 70° C. | 0.217 cm/min | 0.0159 cm/min |

*Procedure as described in ACS Rubber Division Preprint - Toronto, Spring 1983, Paper 51.
**Number of effective crosslinks per unit volume of rubber.

The data from Table III indicates that when the sulfur donor - MTS, is used with dithiocarbamyl triazine (typical of an EV cure system) chemical equivalency of crosslinks and density can be realized when compared to a conventional cure system. This is surprising since sulfur donor cure systems generally give a high proportion of mono and di-sulfide crosslinks, while conventional cure systems will give a high percentage of polysulfidic crosslinks.

While obtaining the same cure state (30.0 dNm vs. 29.5 dNm), faster cure times are realized for the MTS/DTCT cure - 9.5 minutes vs 21.9 minutes.

Based on the equivalency of crosslink density, crosslink types and final compound modulus, it would be expected that the two cure systems would act identical. However, the morpholine tetrasulfide/dithiocarbamyltriazine cure unexpectedly provides superior fatigue properties over the conventional cure (0.022 cm/min flex cut growth vs. 0.037 cm/min flex cut growth, unaged) as well as improved retention of properties on aging (300% M increase 33% vs 104%, tear (42% loss vs 80% loss), flex fatigue (0.0159 cm/min crack growth vs .217 cm/min crack growth).

In addition, the sulfur donor system (morpholine tetrasulfide/DTCT) does not possess the deficiencies normally found in a conventional cure system, that is lower unaged strength properties (tensile and tear) and fatigue properties, unaged tensile strength is actually better (tensile 15.7 MPa vs. 14.1 MPa).

A comparison of the physical properties of Example 1 with Comparative 1 amply supports the discovery of this invention. The MTS/DTCT cure system of this invention provides unexpected and improved physical properties despite the chemical similarity of the vulcanizate networks.

Examples 3 & 4

These experiments were conducted to demonstrate that MTS and morpholine disulfide (MDS) are equivalent in the system of this invention. The formulations set out in Table IV were used for Examples 3 and 4, all parts are parts by weight.

TABLE IV

| Compound | Example 3 | Example 4 |
| --- | --- | --- |
| Polyisoprene | 40 | 40 |
| Cis-1,4-polybutadiene | 60 | 60 |
| Carbon Black | 50 | 50 |
| Tackifier | 10 | 10 |
| Process Oil | 5 | 5 |
| Amine Antidegradants | 5.25 | 5.25 |
| Stearic Acid | 1.0 | 1.0 |
| ZnO | 3.5 | 3.5 |
| Sulfur | 0.07 | 0.34 |
| MTS | 1.25 | — |
| MDS | — | 1.12 |
| DTCT | 0.40 | 0.40 |

In Examples 3 and 4 of Table IV, MTS and MDS were used at the same molar concentrations —4.16 millimoles. Since MTS contains 42.7% usable sulfur and MDS contains 23.9% usable sulfur, this required the addition of 0.27 phr free sulfur to Example 4 to provide the same total sulfur level as in Example 3.

As in the procedure described for Example 1, the formulations were cured for 20 minutes at 150° C. and tested for physical properties. Table V sets out the results for Examples 3 and 4.

TABLE V

| | Example 3 | Example 4 |
| --- | --- | --- |
| Monsanto Rheometer, 1°Arc, 150° C. | | |
| $M_{HF}$, Torque Units (dNm) | 28.5 | 29.6 |
| $M_L$, Torque Units (dNm) | 8.3 | 8.3 |
| Cure Time, t'c(90), min. | 10.0 | 8.8 |
| Cure Time, t'c(25), min. | 4.2 | 4.0 |
| Crosslink Density and Type Analysis | | |
| Density, $v \times 10^4$ | 0.939 | 0.950 |
| % $S_x$, polysulfide | 51.7 | 51.1 |
| % $S_2$, disulfide | 33.1 | 34.4 |
| % $S_1$, monosulfide | 15.2 | 14.5 |
| Stress-Strain Data | | |
| Modulus at 300% Elongation, MPa | 4.7 | 4.8 |
| Tensile Strength, MPa | 14.0 | 14.0 |
| Elongation at break, % | 650 | 690 |
| Change in Stress-Strain Properties on Air Oven Ageing 14 Days at 70° C. | | |
| M 300%, % | +19 | +21 |
| TS, % | −5.7 | −4.3 |
| EB, % | −4.6 | −8.6 |
| DeMattia Flex Crack Growth, ASTM D813 Test at 93° C. Crack Growth Rate (cm/min) | | |
| Unaged | 0.005 | 0.005 |

The data of Table V demonstrates that crosslink density and types, tensile strength, modulus, cure states, and fatigue properties were the same for both MTS and MDS showing the interchangeability of morpholine polysulfides when cured with dithiocarbamyl triazine.

Examples 5-8

Various combinations of MTS & DTCT were compounded into the masterbatch set out in Table VI and were tested as previously described. The data are set forth in Table VI.

TABLE VI

| Parts by Weight | |
| --- | --- |
| Polyisoprene | 40 |
| Cis-1,4-polybutadiene | 60 |
| Carbon Black | 50 |
| Tackifiers | 10 |
| Processing Aids | 5 |
| Antidegradants | 4 |
| Stearic Acid | 1 |
| Zinc Oxide | 3.5 |

The curative combinations and cure behavior for Examples 5-8 as measured by an oscillating disc rheometer at 150° C. are shown in Table VII.

TABLE VII

| | | 150° C. Rheometer | | |
| --- | --- | --- | --- | --- |
| Ex. | Cure System | t25 (min.) | ΔT(dNm) | Reversion |
| 5 | 1.50 phr MTS | 4.9 | 8.8 | 11% in 52 min. |
| 6 | 1.50 phr DTCT* | — | 0 | — |
| 7 | 0.75 phr MTS plus 0.75 phr DTCT | 4.1 | 10.5 | None in 60 min. |
| 8 | 1.50 phr MTS plus 1.50 phr DTCT | 2.8 | 17.2 | None in 60 min. |

*DTCT = 2,4-bis(dimethyldithiocarbamyl)-6-chloro-1,3,5-triazine.

The data from Table VII shows that MTS alone cures with a slow rate and gives appreciable reversion on extruded cure, and that DTCT alone does not cure at all. This is in marked contrast to other dithiocarbamyl accelerators such as tetramethylthiuram disulfide, which alone gives a fast, scorchy cure in this formulation at 1.50 phr level (t25 min. of 2.8; a ΔT(dNm) of 9.0 and reversion of 0 in 60 minutes).

Unexpectedly, combinations of MTS and DTCT cure at faster rates and to higher states of cure than MTS alone, plus show no cure reversion. Thus the cure systems of this invention provide excellent cure rates and physical properties.

Examples 9-17

Using the masterbatch formulation set out in Table VI, various combinations of morpholine tetrasulfide with different dithiocarbamyl triazines were compounded into the masterbatch. The cure behavior for Examples 9–17 was characterized by an oscillating disc rheometer at 150° C. as shown in Table VIII.

TABLE VIII

| Component | 9 | 10 | 11 | 12 | 13 | 14 | 15 | 16 | 17 |
|---|---|---|---|---|---|---|---|---|---|
| Masterbatch | 174.5 | 174.5 | 174.5 | 174.5 | 174.5 | 174.5 | 174.5 | 174.5 | 174.5 |
| MTS[a] | 1.25 | 1.25 | 1.25 | 1.25 | 1.25 | 1.25 | 1.25 | 1.25 | 12.5 |
| MTCT[b] | 0.20 | 0.40 | 0.60 | — | — | — | — | — | — |
| DTCT[c] | — | — | — | 0.20 | 0.40 | 0.60 | — | — | — |
| TTCT[d] | — | — | — | — | — | — | 0.20 | 0.40 | 0.60 |
| Rheometer, 150° C. | | | | | | | | | |
| t2, min. | 5.4 | 4.9 | 4.5 | 4.9 | 4.3 | 4.0 | 4.6 | 3.9 | 3.3 |
| t'25, min. | 5.9 | 5.4 | 5.1 | 5.4 | 4.8 | 4.6 | 5.1 | 4.4 | 3.8 |
| t'90, min. | 13.5 | 12.0 | 11.4 | 12.2 | 10.8 | 11.1 | 11.3 | 10.2 | 10.1 |
| $M_{HF}$-$M_L$, dNm | 10.8 | 12.0 | 12.65 | 11.5 | 12.7 | 13.6 | 12.0 | 13.4 | 15.5 |
| Reversion in 30 min., dNm | 0.10 | Trace | 0 | 0.10 | Trace | 0 | 0.10 | Trace | 0 |

[a]MTS = Morpholine tetrasulfide = tetrathiobismorpholine.
[b]MTCT = 2-dimethyldithiocarbamyl-4,6-dichloro-1,3,5-triazine.
[c]DTCT = 2,4-bis(dimethyldithiocarbamyl)-6-chloro-1,3,5-triazine.
[d]TTCT = 2,4,6-tris(dimethyldithiocarbamyl)-1,3,5-triazine.

These data demonstrate fast cure, reversion resistance and high moduli for a range of compositions and a range of substituted dithiocarbamate triazine structures.

Although the invention has been illustrated by typical examples, it is not limited thereto. Changes and modifications of the examples of the invention herein chosen for purposes of disclosure can be made which do not constitute departure from the scope of the invention.

The embodiments in the invention in which an exclusive property or privilege is claimed are defined as follows.

We claim:

1. A process for vulcanizing a sulfur vulcanizable rubber selected from the group consisting of styrene/butadiene copolymers, polyisoprene, natural rubber, polybutadiene, ethylene/propylene/diene terpolymers, butadiene/isoprene copolymers, butadiene/isoprene/styrene terpolymers, and blends thereof., said process comprising: (1) admixing an effective amount of a vulcanization system with the vulcanizable rubber, said vulcanization system comprising: (a) a morpholine polysulfide containing from 2 to 5 sulfur atoms and (b) a dithiocarbamyl triazine of the structural formula:

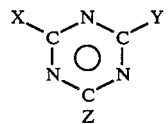

wherein X, Y and Z are the same or different radicals selected from the group consisting of halogen, alkoxy of 1-8 carbon atoms, the radical —S—R wherein R can be from 1-8 carbon atoms, the radical —N—R$^1$—R$^2$ wherein R$^1$ and R$^2$ can be the same or different radicals of 1 to 8 carbon atoms or R$^1$ and R$^2$ taken together complete with the nitrogen atom to which they are attached can form a six membered ring which may contain oxygen as a heteroatom, and a dithiocarbamyl radical of the formula:

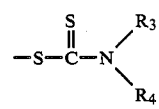

wherein R$^3$ and R$^4$ are the same or different radicals selected from alkyl of 1 to 8 carbon atoms or R$^3$ and R$^4$ taken together with the nitrogen atom to which they are attached form a six membered ring which may contain oxygen as a heteroatom; with the proviso that at least one of X, Y or Z is always a dithiocarbamyl radical and (c) sulfur; wherein the weight percent of component (a) can range from 20 to 98%, the weight percent of component (b) can range from 2 to 40% and the weight percent of component (c) can range from 0 to 70% based on the total weight of the composition with the proviso that the weight percent of (a) is always equal to or greater than the weight percent of (b); (2) heating the admixture to a temperature of from 100°–250° C.

2. The process of claim 1 in which the quantity of the vucanization system employed is between 0.1 and 10 parts per 100 parts of vulcanizable rubber.

3. A process according to claim 1 wherein the morpholine polysulfide is morpholine tetrasulfide and the dithiocarbamyl triazine is 2,4-bis-(dimethyldithiocarbamyl)-6-chloro-1,3,5-triazine.

4. A process according to claim 1 wherein the morpholine polysulfide is morpholine tetrasulfide and the dithiocarbamyl triazine is selected from the group consisting of 2,4-bis (dimethyldithiocarbamyl)-6-chloro-1,3,5-triazine; 2-dimethyldithiocarbamyl-4,6-dichloro-1,3,5-triazine; and 2,4,6-tris-(dimethyldithiocarbamyl)-1,3,5-triazine.

* * * * *